US008929953B2

(12) United States Patent
Asplund et al.

(10) Patent No.: US 8,929,953 B2
(45) Date of Patent: Jan. 6, 2015

(54) METHOD AND ARRANGEMENT FOR COORDINATING POLARIZATIONS IN A WIRELESS COMMUNICATION SYSTEM

(75) Inventors: Henrik Asplund, Stockholm (SE); Bo Hagerman, Tyreso (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 350 days.

(21) Appl. No.: 13/515,862

(22) PCT Filed: Dec. 16, 2009

(86) PCT No.: PCT/EP2009/009021
§ 371 (c)(1),
(2), (4) Date: Jun. 14, 2012

(87) PCT Pub. No.: WO2011/072702
PCT Pub. Date: Jun. 23, 2011

(65) Prior Publication Data
US 2012/0252369 A1     Oct. 4, 2012

(51) Int. Cl.
*H04B 7/10*     (2006.01)
*H04B 7/02*     (2006.01)

(52) U.S. Cl.
CPC . *H04B 7/022* (2013.01); *H04B 7/10* (2013.01)
USPC ...................... 455/562.1; 455/561; 455/67.11

(58) Field of Classification Search
CPC ......... H01Q 21/24; H01Q 25/001; H04B 7/10
USPC .................... 455/562.1, 67.11, 561
See application file for complete search history.

(56) References Cited

U.S. PATENT DOCUMENTS 5,691,727 A * 11/1997 Cyzs .............................. 342/361
5,903,238 A * 5/1999 Sokat et al. ................ 455/562.1
(Continued)

FOREIGN PATENT DOCUMENTS

| EP | 2031768 A1 | 3/2009 |
| JP | 2004080353 A * | 3/2004 |
| WO | WO 0154230 A1 * | 7/2001 |

OTHER PUBLICATIONS

TenXc Wireless Inc, "Pre-coded MIMO DL for E-UTRA exploiting X-pol antennas", 3GPP TSG RAN WG1, R1-051326, Nov. 7-11, 2005, pp. 1-6, XP050100926.

*Primary Examiner* — Gennadiy Tsvey
(74) *Attorney, Agent, or Firm* — Rothwell, Figg, Ernst & Manbeck, P.C.

(57) ABSTRACT

An object of the present invention is to enable coordination of VP/HP polarizations generated by cross-polarized, i.e. orthogonally polarized antenna configurations, of one radio device with another radio device. The object is achieved by a method in a first eNB (100*c*) of coordinating polarizations of the first eNB with polarizations of an additional eNB (100*a*). The polarizations are generated by an antenna configuration comprising at least two orthogonally polarized antennas. The first and additional eNB (100*c*, 100*a*) communicate wirelessly with a UE (150*a*). The method comprises the steps of establishing a first amplitude and/or phase offset of the antenna configuration generating a vertical or horizontal polarization, and a second amplitude and/or phase offset of the antenna configuration generating a polarization orthogonal to said polarization generated by the first amplitude and/or phase offset, defining the polarization generated by the first amplitude and/or phase offset to be vertical and the polarization generated by the second amplitude and/or phase offset to be horizontal, determining a polarization of the UE, and coordinating the defined polarizations with polarizations of the additional eNB based on the determined UE polarization.

32 Claims, 13 Drawing Sheets

(56) References Cited

U.S. PATENT DOCUMENTS

| | | | |
|---|---|---|---|
| 6,181,920 B1* | 1/2001 | Dent et al. | 455/101 |
| 6,411,824 B1* | 6/2002 | Eidson | 455/561 |
| 6,697,641 B1* | 2/2004 | Shapira | 455/562.1 |
| 7,369,814 B2* | 5/2008 | Lucidarme et al. | 455/69 |
| 7,933,343 B2* | 4/2011 | Emami et al. | 375/260 |
| 8,165,048 B2* | 4/2012 | Imaeda | 370/310 |
| 8,649,747 B1* | 2/2014 | Emmanuel et al. | 455/121 |
| 2002/0018483 A1* | 2/2002 | Kuwabara et al. | 370/430 |
| 2002/0164954 A1* | 11/2002 | Jalali | 455/67.1 |
| 2003/0092402 A1* | 5/2003 | Shapira et al. | 455/101 |
| 2003/0162566 A1* | 8/2003 | Shapira et al. | 455/561 |
| 2003/0199270 A1* | 10/2003 | Hamalainen et al. | 455/424 |
| 2004/0043736 A1* | 3/2004 | Hamalainen | 455/234.1 |
| 2004/0203538 A1 | 10/2004 | Leppanen et al. | |
| 2005/0260954 A1* | 11/2005 | Hamalainen et al. | 455/101 |
| 2007/0080868 A1 | 4/2007 | Hwang et al. | |
| 2009/0156235 A1* | 6/2009 | Johansson et al. | 455/456.6 |
| 2009/0227260 A1* | 9/2009 | Anreddy et al. | 455/450 |
| 2009/0227292 A1* | 9/2009 | Laroia et al. | 455/562.1 |
| 2011/0007758 A1* | 1/2011 | Macrae | 370/480 |

* cited by examiner

METHOD AND ARRANGEMENT FOR COORDINATING POLARIZATIONS IN A WIRELESS COMMUNICATION SYSTEM

CROSS REFERENCE TO RELATED APPLICATION(S)

This application is a 35 U.S.C. §371 National Phase Entry Application from PCT/EP2009/009021, filed Dec. 16, 2009, designating the United States, the disclosure of which is incorporated by reference herein in its entirety.

The present invention relates generally to methods and arrangements in a radio device and a control device. More particularly, it relates to coordination of antenna polarizations of one radio device with another one.

BACKGROUND

The Universal Mobile Telecommunication System (UMTS) is one of the third generation mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, lowered costs etc. The Universal Terrestrial Radio Access Network (UTRAN) is the radio access network of a UMTS and evolved UTRAN (E-UTRAN) is the radio access network of an LTE system.

As illustrated in FIG. 1, an E-UTRAN typically comprises user equipments (UE) 150a, 150b wirelessly connected to radio base stations (RBS) 100a, 100b, 100c commonly referred to as eNodeBs (eNB). In such a wireless communication system, it is desirable to reuse as much of the radio resources in each cell 110a, 110b, 110c as possible to achieve good spectral efficiency. However, whenever a resource is reused this may lead to interference (intra-cell or inter-cell interference) between the links utilizing this particular resource.

Various approaches to manage the interference are known. One approach relies on actively selecting which UEs that can access a particular resource based on channel state information for these UEs. Of all possible UEs, those who interfere the least with each other may be scheduled jointly. Another approach is to use information about eNB and UE antenna polarization when allocating radio resources to the UEs, so called polarization-based interference management, as the isolation is good (i.e. the interference is low) between orthogonally polarized transmissions.

The benefit of using antenna polarization information when scheduling radio resources to UEs is greatest when the transmissions to and from UEs are primarily either vertically polarized (VP) or horizontally polarized (HP). The reason for this is that these polarizations are well preserved in the wireless propagation channel, even in heavily shadowed situations. A transmitted vertically polarized wave will thus keep its vertical polarization throughout the propagation to a receiving side with a very limited cross-polarization scattering, and the corresponding is true for a horizontally polarized wave. In contrast, polarizations that contain elements of both VP and HP are not as well preserved and will therefore be less useful.

Due to the limited amount of cross-polarization scattering in the radio channel, the vertical-to-vertical and horizontal-to-horizontal polarization combinations (transmitting antenna and receiving antenna polarization combination) provide an equal received signal power on average, while the cross-polarized combinations (vertical-to-horizontal or vice versa) typically provide 5-15 dB weaker received signal power. A signal transmitted by an eNB with a VP transmission antenna will thus be received as a stronger signal in a UE with a VP receiving antenna (i.e. a vertical-to-vertical polarization combination) than in a HP receiving antenna (vertical-to-horizontal polarization combination).

The basic idea of polarization-based interference management is in the following described with reference to FIG. 2a. A UE 150b with a VP antenna would benefit from being scheduled to transmit to or receive from eNBs 100b, 100c utilizing a transmission/receiving mode generating a VP, thus providing a VP-to-VP combination channel 220, jointly with a second UE 150a that has a HP antenna and that is scheduled to eNBs 100c, 100a utilizing a transmission/receiving mode generating a HP and thus providing a HP-to-HP combination channel 210. The interference suppression between the two UEs 150a, 150b will be an additional 5-15 dB compared to if the two UEs would both have been using the same polarization combination (i.e. non-orthogonal polarization).

There are some properties that will enable the system described in FIG. 2a to provide the best possible polarization-based interference suppression. One first property is the ability of the eNBs to distinguish VP and HP from other polarizations in uplink, i.e. to assure that the receiving antennas of the RBSs generate a VP or HP, so that they can determine the UEs polarizations through uplink power measurements. A second property is the ability of the eNBs to transmit these two polarizations that are well preserved on the downlink, i.e. to assure that the transmitting antennas of the RBSs generate a VP or HP also in downlink. A third property is the common understanding of which polarization is VP and which is HP, both within an eNB between the receiving and the transmitting side, and between two or more eNBs.

One straight forward solution to assure the first and second properties described above, is to use VP/HP-polarized antenna configurations, and to apply the output power to one antenna at a time. However, there are several reasons why slant +45/−45 polarized antennas are preferred to VP/HP polarized antennas. One reason is that slant +45/−45 polarized antenna configurations provides symmetry of the radiation patterns. Another reason is that slant +45/−45 polarized antennas generate polarization orthogonality away from bore sight, i.e. in all directions. Yet another reason has to do with power amplifier (PA) utilization. As there is one PA for each antenna, it is preferable to transmit a signal using both antennas, as the output power then can be doubled compared to if only one antenna and one PA is used. With a slant +45/−45 polarized antenna configuration, a VP or HP transmission would use both antennas and both PAs. With a VP/HP antenna configuration, a VP or HP transmission would use only one antenna and PA, thus leading to less output power. The drawbacks of VP/HP polarized antenna configurations has resulted in that the overwhelming majority of existing sites with dual-polarized antennas utilize slant +45/−45 polarized antennas.

However, when slant +45/−45 polarized antennas are used, the transmitters and receivers need to be phase coherent to ensure that VP/HP polarized signals can be distinguished. The coherency should be relative, which can be achieved using calibration circuitry, such that the phase offset is constant over time and frequency. Furthermore, the phase offsets of the antennas required to achieve absolute VP or HP transmission or reception needs to be known. One solution to find the phase offsets required is to introduce external calibration equipment to detect and adjust the absolute polarization by tuning the phase offsets of the two cross-polarized antennas. This is however a costly solution as external equipment is needed.

Still another solution is to adjust the polarization of the transmitting antenna configuration based on a quality indicator, such as the rank indicator or the throughput, of the communication between the eNB and the UEs. The basic idea of such a solution, is that an absolute VP/HP polarization of the transmissions, will result in an optimal quality of the communication due to the beneficial characteristics of such polarizations described above. A quality indicator may thus be used to determine if an adjustment of the antenna configuration polarization, through a change of the phase offset between the two cross-polarized antennas, is improving the quality of the communication or not. By iterating the steps of checking the quality indicator and of adjusting the polarization until an optimal value of the quality indicator is reached, it is possible to determine what phase offsets that generate a VP or a HP. A calibration of the absolute polarization state is thus achieved, but an ambiguity regarding the interpretation of VP and HP will still remain since it is not possible to find out what phase offset that generates VP and what phase offset that generates HP, which is a prerequisite for using polarization-based interference management as described with reference to FIG. 2a above. Furthermore, the phase offsets of the receiving antenna configuration are not established with the above described methods.

Using VP/HP-polarized antenna configurations would probably not either solve the problem of not knowing what offset that would generate VP and what offset that would generate HP, as there is normally no control at site installation that the VP antenna is always connected to the first antenna port and the HP antenna to the second antenna port. Applying all power to the antenna connected to the first antenna port will thus generate either a VP or a HP, but it is not known which one without having to take special care to the antenna-to-antenna port connection during site installation. Thus, also in this case, the ambiguity regarding the interpretation of VP and HP is a problem.

Due to the ambiguity problem, the eNBs will have to assume which amplitude and/or phase offsets that will result in VP and HP respectively, both on uplink and on downlink. This assumption creates problems when using polarization-based interference management, as the third property mentioned above regarding the common understanding of which polarization is VP and which is HP between the receiving and the transmitting side of an eNB or between two or more eNBs, will not be fulfilled. How this affects the interference suppression is described in the following with reference to FIG. 2b. One of the three eNBs 100c has assumed the opposite definition of VP/HP for the transmitting antenna compared to the other two 100a, 100b. If a scheduler orders simultaneous transmission from eNBs 100c and 100a to a first UE 150a with HP, and from eNBs 100c and 100b to a second UE 150b with VP, then eNB 100c will transmit with opposite polarizations compared to the other eNBs 100a, 100b, leading to severe interference at each UE 150a 150b.

SUMMARY

The object of the present invention is to address some of the problems and disadvantages outlined above, and to enable coordination of VP/HP polarizations generated by cross-polarized, i.e. orthogonally polarized antenna configurations, of one radio device with another radio device such as an RBS. This is desirable in order to get the full potential of the VP/HP interference suppression possibilities.

This object and others are achieved by the method and device according to the independent claims, and by the embodiments according to the dependent claims.

In accordance with a first aspect of the present invention, a method of coordinating polarizations of a first radio device with polarizations of an additional radio device is provided. The polarizations are generated by an antenna configuration comprising at least two orthogonally polarized antennas. The first and additional radio devices communicate wirelessly with at least one further radio device. The method is performed by the first radio device and comprises the step of establishing a first amplitude and/or phase offset of the antenna configuration generating a vertical or horizontal polarization, and a second amplitude and/or phase offset of the antenna configuration generating a polarization orthogonal to said polarization generated by the first amplitude and/or phase offset. It also comprises the steps of defining the polarization generated by the first amplitude and/or phase offset to be vertical and the polarization generated by the second amplitude and/or phase offset to be horizontal, determining a polarization of at least one of said further radio devices, and coordinating the defined polarizations with polarizations of the additional radio device based on the determined polarization.

In accordance with a second aspect of the present invention, a method for a control device of coordinating polarizations of a first radio device with polarizations of an additional radio device is provided. The control device is connected to the first and additional radio device, and the polarizations are generated by an antenna configuration comprising at least two orthogonally polarized antennas. The first and additional radio devices communicate wirelessly with at least one further radio device. The method comprises the steps of retrieving information regarding a polarization of the at least one further radio device from at least one of the first and additional radio devices, and instructing at least one of the first and additional radio devices to interchange when the retrieved information indicates a polarization mismatch.

In accordance with a third aspect of the present invention, a first radio device comprising an antenna configuration with at least two orthogonally polarized antennas is provided. The first radio device is configured to coordinate polarizations generated by the antenna configuration with polarizations generated by an antenna configuration of an additional radio device. The first and additional radio devices are configured to communicate wirelessly with at least one further radio device. The first radio device comprises an establishing unit arranged to establish a first amplitude and/or phase offset of the antenna configuration generating a vertical or horizontal polarization, and a second amplitude and/or phase offset of the antenna configuration generating a polarization orthogonal to said polarization generated by the first amplitude and/or phase offset. It further comprises a defining unit arranged to define the polarization generated by the first amplitude and/or phase offset to be vertical and the polarization generated by the second amplitude and/or phase offset to be horizontal, a determining unit arranged to determine a polarization of at least one of said further radio devices, and a coordinating unit arranged to coordinate the defined polarizations with the polarizations of the additional radio device based on the determined polarization.

In accordance with a fourth aspect of the present invention, a control device connectable to a first and an additional radio device is provided. The control device is configured to coordinate polarizations of the first radio device with polarizations of the additional radio device. The polarizations are generated by an antenna configuration comprising at least two orthogonally polarized antennas The first and additional radio devices communicate wirelessly with at least one further radio device. The control device comprises a retrieving unit arranged to retrieve information regarding a polarization of the at least one further radio device from at least one of the first and additional radio devices, and an instructing unit arranged to instruct at least one of the first and additional radio devices to interchange when the retrieved information indicates a polarization mismatch.

An advantage of embodiments of the present invention is that an absolute antenna polarization of an RBS or UE can be unambiguously determined to be HP or VP in a cost efficient way through coordination between RBSes or UEs.

A further advantage of embodiments of the present invention is that the coordination may be system wide, comprising e.g. all RBSs of a system.

Furthermore, an advantage of embodiments of the present invention is that they make it possible to use polarization-based interference management in an efficient way.

Still another advantage of embodiments of the present invention is that it is applicable to all kinds of dual-polarized antenna configurations, such as slant +45/−45 polarized antennas which are and will most likely continue to be the predominant choice in RBS site installations, but also right-hand/left-hand circular antennas or VP/HP antennas. Furthermore, an advantage is that no special care with regards to how the antenna ports are connected to the antennas is needed at site installation.

DETAILED DESCRIPTION

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular the invention is described in a non-limiting general context in relation to a slant +45/−45 polarized antenna configuration of an eNB in an E-UTRAN. It should though be noted that the invention and its exemplary embodiments may also be applied to other antenna configurations such as VP/HP and circular antenna configurations, to RBSs in other types of radio access networks such as UTRAN, WiMax and GSM, to relays, as well as to user equipments (UE) in E-UTRAN, UTRAN, WiMax and GSM. Examples where it may be useful in a UE is when the UE antenna configurations are stationary or have a well-defined orientation during operation, as in the case of fixed wireless terminals, laptops and vehicle mounted UE antennas.

Figure 1:
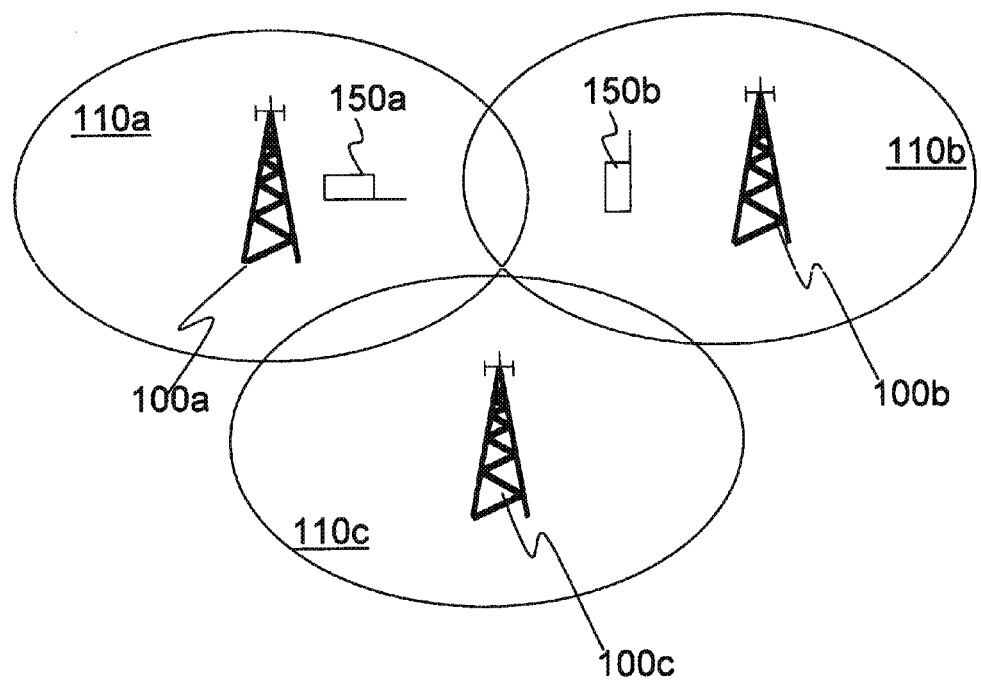
FIG. 1 illustrates schematically a part of a conventional wireless communication system wherein the present invention may be implemented.
Figure 2A:
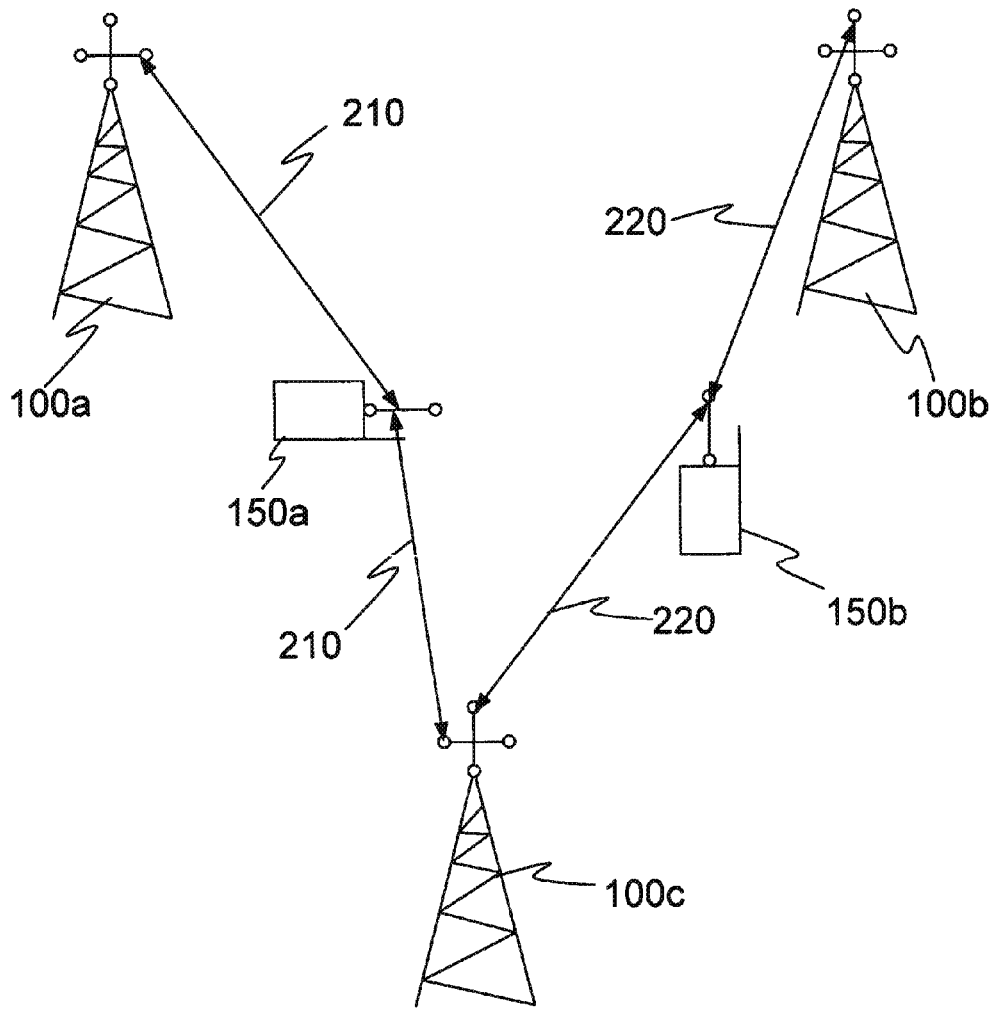
FIG. 2a illustrates schematically the basic idea of polarization-based scheduling according to prior art.
Figure 2B:
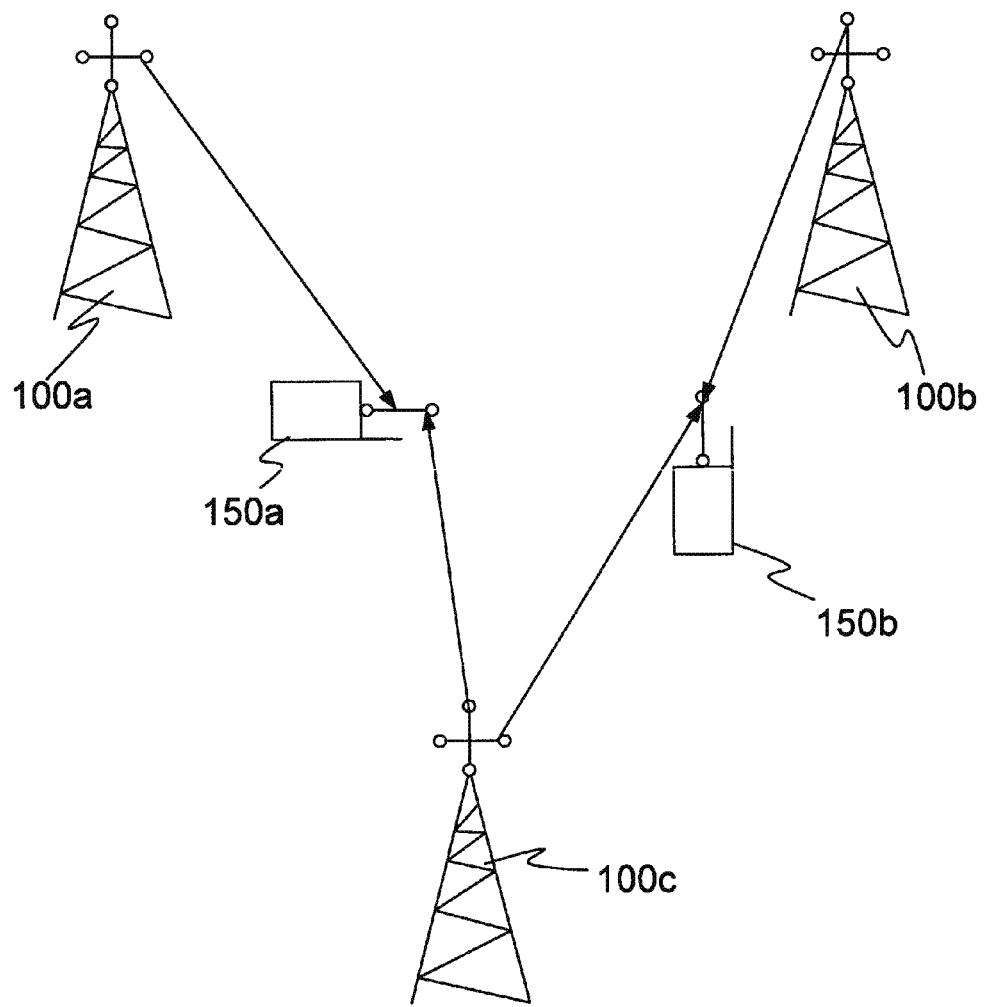
FIG. 2b illustrates schematically how the ambiguity of the interpretation of the VP/HP polarization affects polarization-based scheduling according to prior art.
Figure 2C:
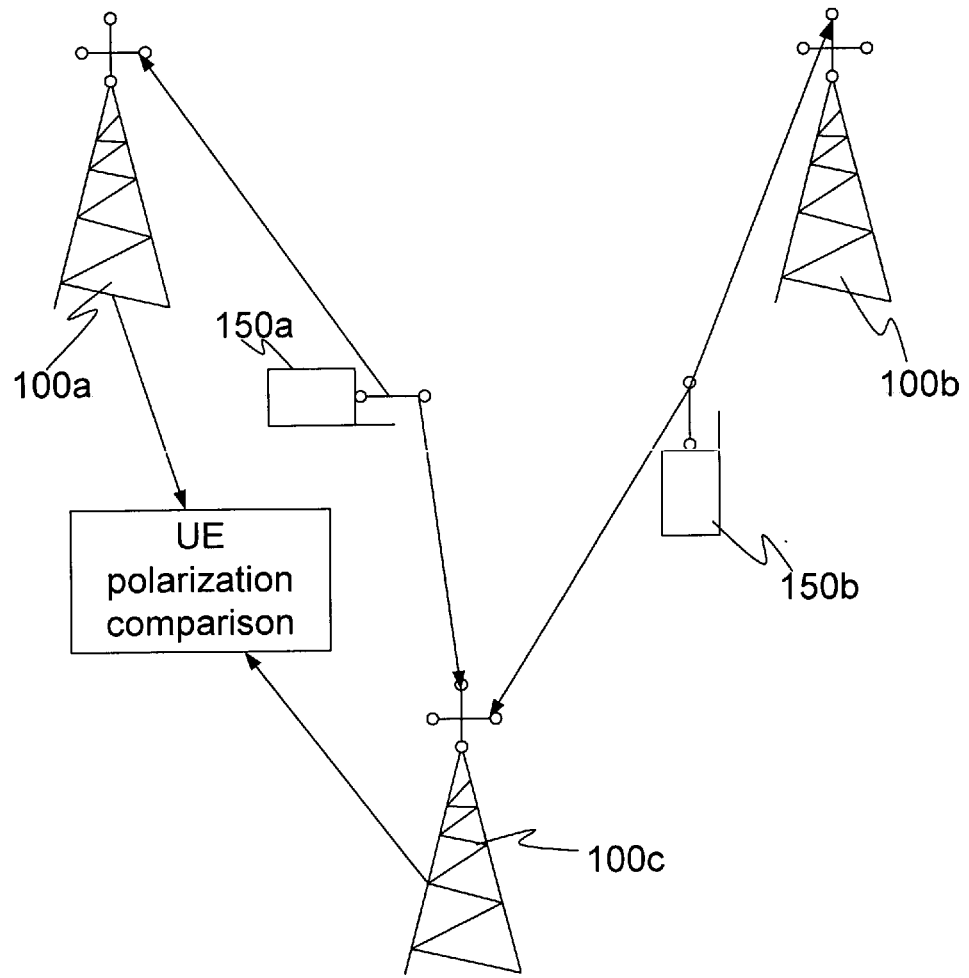
FIG. 2c illustrates schematically the basic idea of the present invention.

The basic idea of the present invention, described with reference to FIG. 2c, is to coordinate the polarizations of a first eNB 100a with those of a second eNB 100c, by first establishing the phase offsets between the cross-polarized antennas that are necessary to achieve absolute polarizations which are ambiguously vertical and horizontal for both eNBs. The phase offset is the phase shift that needs to be applied to signals transmitted/received on the second antenna of a cross-polarized antenna configuration in relation to the signals transmitted/received on the first antenna of a cross-polarized antenna configuration. If VP/HP polarized antennas are used, no phase offset between the cross polarized antennas may be needed, but only an amplitude offset. With an amplitude offset, all power may be directed to one of the two cross polarized antennas to generate VP or HP. Each eNB will then define which offset that is assumed to generate VP and which one that is assumed to generate HP.

Secondly, the eNBs will both determine the polarization of one UE 150a, e.g. with uplink measurements, which is further described below. Based on this determined polarization, the eNBs will thus be able to coordinate their horizontally and vertically defined polarizations. A comparison of the determined UE polarization may be done either in one of the eNBs or in an external control device. If the determined UE polarizations differ, one of the eNBs should interchange the definitions of what polarization the first and second offsets generate. In this way, the two eNBs have arrived at a common understanding of what polarization that is defined to be vertical and what polarization that is defined to be horizontal. One advantage of this solution is that the polarization-based interference suppression will work in an optimal way when the eNBs have coordinated the definitions of what is VP and what is HP. Furthermore, no special care with regards to how the antenna ports are connected to the antennas is needed at site installation in order to coordinate the defined polarizations.

The determination of the polarization state of UEs are preferably done simultaneously by the two eNBs 100a, 100c on the same UE 150a, but it is possible that non-simultaneous measurements may give sufficient information. For instance, the first eNB 100a could measure on the UE 150a while it is in the coverage area of the first eNB 100a, while the second eNB 100c measures at a later time when the UE 150a enters the coverage area of the second eNB 100c. Likewise, measurements of different UEs could be used if there is reason to believe that the polarization states of these UEs will be similar, as in the case of UEs of the same model and brand.

In a first embodiment of the present invention, it is the eNBs themselves that decide if their definitions of what offset that generates VP and what offset that generates HP should be interchanged. In such a solution, a pair of eNBs with opposite definitions may both decide to interchange their definitions, which will thus not solve the problem as the next comparison of the UE polarization state will still say that they have opposite definitions. The solution may be to have a pre-defined or dynamic hierarchy determining which one of the eNBs that will decide where the interchange should be done.

In an alternative second embodiment, it is a control device that decides which eNB that should keep its polarization definitions and which one that should interchange definitions when there is a mismatch between the determined UE polarization state. This embodiment has an advantage when there are more than two eNBs that should coordinate their polarizations with each other, as there is only one device that decides. In the previously described first embodiment, a first pair of eNBs may coordinate with each other and a second pair of eNBs may coordinate with each other, but the first and second pair may be uncoordinated with each other. This situation is avoided with one single control device that is deciding.

In one alternative embodiment, an eNB will forward its determined UE polarization to the control device or the other eNB. When using a control device, the control device will also be receiving determined UE polarizations from other eNBs, and will be able to compare the different eNB's determined UE polarizations. It will identify which eNBs that need to interchange their polarization definitions, based on this comparison. The identified eNBs will be instructed by the control device to interchange their definitions of what offset that generates a vertical polarization and what offset that generates a horizontal polarization, which will thus result in coordinated polarizations for all the eNBs.

If one first eNB forwards its determined UE polarization to another second eNB instead of to the control device, the second eNB will be able to compare the received UE polarization with its own determined UE polarization. If the received UE polarization is different from the determined UE polarization, then an interchange is needed, and the second eNB may either interchange its own definitions, or instruct the first eNB to interchange.

In one alternative embodiment, a first eNB will retrieve a UE polarization from a second eNB. The first eNB will then establish if there is a mismatch of the polarization or not, by comparing the retrieved UE polarization with the own determined UE polarization. If there is a mismatch, the first eNB will forward information regarding the mismatch to the control device, which will then decide which eNB that should do the interchange based on the mismatch information. In this case it is thus the eNBs that do the comparison of polarizations, but it is the control device that decides about the interchange when there is a mismatch. The first or the second eNB may thus be instructed by the control device to interchange. Alternatively, the mismatch information could also be forwarded to the second eNB, who would then decide about an interchange performed either in the second eNB itself or in the first eNB, instructed by the second eNB.

In another embodiment, where it is the eNBs that controls the coordination and not a control device, the coordination between eNBs can be expanded to more than two eNBs, forming successively larger groups of eNBs with coordinated polarizations in the following way. A first of the two already coordinated eNBs 100c may e.g. coordinate its polarization definitions with a third eNB 100b. If the first already coordinated eNB 100c controls the third eNB 100b, e.g. because it is higher up in the coordination hierarchy, it may e.g. just forward its determined UE polarization to the third eNB 100b, and it is up to the third eNB 100b to compare and interchange its own definitions if there is a mismatch. But if it is the third eNB 100b that controls the first coordinated eNB 100c, then the third eNB 100b will forward its determined UE polarization to the first eNB 100c, which will have to interchange definitions if there is a mismatch. As the first eNB 100c has already coordinated once with the second eNB 100a, the first eNB 100c may also inform the second eNB 100a that it will interchange its definitions, in order for the second eNB 100a to interchange its definitions as well. Eventually, such successive coordination of polarizations may result in the whole system being coordinated. In order to minimize the number of interchanged definitions, a group of eNBs that have already coordinated internally may be given a higher position in the hierarchy. This would mean that the hierarchy may be dynamically changed, and in this case the hierarchy changes may also be communicated between the eNBs.

Keeping track of pairs or groups of eNBs/radio devices that have successfully coordinated their polarization definitions may be preferable, in order to facilitate further coordination among eNBs/radio devices belonging to different such pairs or groups. Whenever one eNB/radio device in such a group interchanges its polarization definitions due to an additional coordination with an eNB/radio device external to the group, the other eNBs/radio devices belonging to the group can be informed of this or instructed to interchange their polarization definitions to preserve homogeneity within the group. The book-keeping may either be distributed among the different eNBs/radio devices such that each eNB/radio device is aware of all other eNBs/radio devices with which it has coordinated its polarization definitions, or the book-keeping function may be performed at a control unit. Similarly, the instructions to interchange polarizations may be forwarded to an entire group of eNBs/radio devices either directly or in several steps, where a first eNB/radio device is first instructed, and subsequently forwards this instruction to additional eNBs/radio devices that belong to the same "coordinated" group.

The antenna configuration of the eNB may consist of at least one pair of cross-polarized antennas for both transmitting and receiving. Both the receiving and the transmitting antenna configuration phase offsets need to be established when using polarization-based interference suppression in both the uplink and the downlink, as it is important to be able to both receive and transmit VP/HP in that case. This also makes it possible to determine the UE polarization based on either uplink or downlink measurements. The phase offsets to be applied on the receiving antenna configuration will in general be different than the ones applied on the transmitting antenna configuration, due to the fact that transmitter and receiver radio chains may not be phase coherent, and that antenna and feeder characteristics may change as a function of frequency, at least for FDD systems.

In one embodiment of the present invention, the establishment of the phase offsets of a transmitting antenna configuration, is performed based on a quality indicator of the communication between the eNB 100a, 100b and the UE 150a. The eNB obtains at least one quality indicator. The quality indicator may comprise one or more of a Rank Indicator (RI), a throughput measure, a Channel Quality Indicator report (CQI), a HARQ ACK/NACK (Hybrid-ARQ acknowledgment/non-acknowledgement) and any other possible indicator of the quality. It may either be received from the UE 150*a*, or it may be measured by the eNB itself, as for example in the case of the throughput measure. The eNB will then adjust the phase offset of its transmitting antenna configuration and will check again if the quality indicator seems to have improved. The quality indicator measurement and the adjustment of the phase offset will be iterated until a pre-determined optimal quality indicator is obtained. This method will thus provide a first phase offset α that probably generates VP or HP, due to the beneficial characteristics of such polarizations described above. Based on this first established phase offset α, a second phase offset β that generates a polarization that is orthogonal to the polarization generated by the first phase offset α may be established. The second phase offset is equal to the first phase offset plus 180°, i.e. β=α+180°. If the first offset generates VP, then the second offset will thus generate HP.

In another embodiment, the establishment of the phase offsets of a receiving antenna configuration is performed by evaluating different candidate phase offsets until a characteristic particular to VP or HP is observed. Such a characteristic is e.g. the stability over time and/or frequency of the power relation between the polarizations. The eNB may thus measure the signal strength of UE signals for each set of candidate phase offsets. The candidate phase offsets providing the same relation of the received signal strength over time e.g. will thus be selected as the phase offsets that generate VP/HP.

When both the receiving and the transmitting antenna configuration phase offsets have been established according to the two embodiments described above, the polarization generated by the first offset is defined to be vertical, and the one generated by the second offset is defined to be horizontal, for both the transmitting and the receiving antenna configuration. In the next step, a UE antenna polarization is to be determined by the eNB, and this may be done by using either uplink or downlink measurements when applying the corresponding established phase offsets, which is further described below. This means that the coordination of two eNBs may be done based on a comparison of a UE polarization from one eNB determined based on uplink measurements and a UE polarization from another eNB determined based on downlink measurements. Therefore it is also important that the definitions of the polarizations generated by the phase offsets of a receiving antenna configuration are coordinated with the polarization definitions of the transmitting antenna configuration of one same eNB. According to one embodiment of the present invention, the coordination of the polarization definitions is thus performed within an eNB between the receiving and the transmitting antenna radio chains of the eNB.

In the following, the determination of the UE antenna polarization is further described. In one embodiment of the present invention, the UE transmission antenna polarization may be determined by the eNB, based on a measurement of the received signal strength for each defined polarization of the eNB receiver antenna. If it is the offset generating a polarization defined as vertical that provides the highest received signal strength, the eNB can determine the UE antenna polarization to be vertical.

In another embodiment of the present invention, the UE receiving antenna polarization may be determined by the eNB, based on a measurement of a quality indicator of the communication between the eNB and the UE. A similar mechanism as described above for the establishment of the phase offsets based on a quality indicator is used. The quality indicator is thus measured for both the horizontally and the vertically defined polarization of the eNB transmitting antenna, and the measurement that provides the best quality indicator thus indicates the polarization of the UE antenna. If it is the offset that is defined as generating a horizontal polarization that provides the best quality indicator, then the UE antenna polarization is determined to be horizontal.

The two embodiments above describing how to determine the UE antenna polarization may be combined, if both the receiving and the transmitting antenna configuration phase offsets have been established and coordinated with each other. This may be done in order to get a more secure determination of the UE antenna polarization e.g., as it is then determined based on two different kinds of measurements.

As mentioned above, embodiments of the present invention may be applied to UE antennas as well, coordinating their VP/HP definitions with each other. Alternatively, UE antennas may coordinate their definitions once the eNBs have aligned theirs, by way of messages transmitted on VP (or HP) carrying identification of the transmit polarization.

Similarly, the coordination can be made between different frequencies bands of a single eNB, for example between the receive and the transmit frequency band, or between two different transmitting/receiving frequency bands of an eNB. Furthermore, it is also possible that a base station coordinates its polarizations with a relay (or the opposite).

Figure 3A:
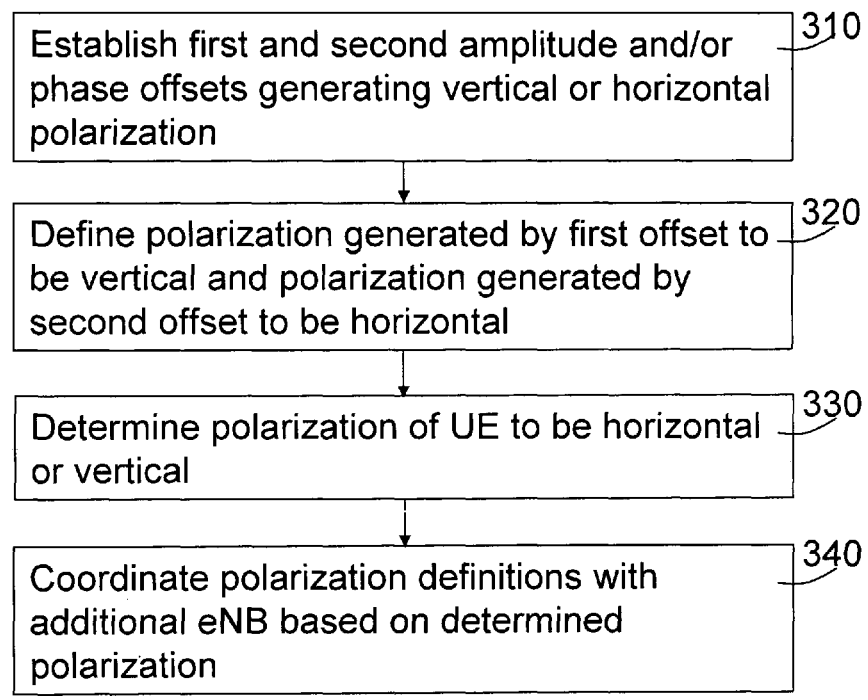
FIGS. 3a-g are flowcharts of the method performed by the eNB according to embodiments of the present invention.

FIG. 3*a* is a flowchart of the method, performed by a first eNB, of coordinating polarizations of the first eNB with polarizations of an additional eNB. The polarizations are generated by the antenna configurations of the eNBs, which comprises two orthogonally polarized antennas. The two eNBs communicate wirelessly with at least one UE. The method comprises the following steps:

310: Establish a first phase offset of the antenna configuration generating a vertical or horizontal polarization, and a second phase offset of the antenna configuration generating a polarization orthogonal to said polarization generated by the first phase offset. In the case of a VP/HP antenna configuration, there is no phase offset needed to generate VP or HP, but rather an amplitude offset, which allows all power to be applied to one of the antennas.

320: Define the polarization generated by the first phase offset to be vertical and the polarization generated by the second phase offset to be horizontal. The eNB now has "guessed" what offset that generates what polarization.

330: Determine a polarization of at least one of the UEs with which the eNB may communicate.

340: Coordinate the defined polarizations with polarizations of the additional eNB based on the determined polarization.

Figure 3B:
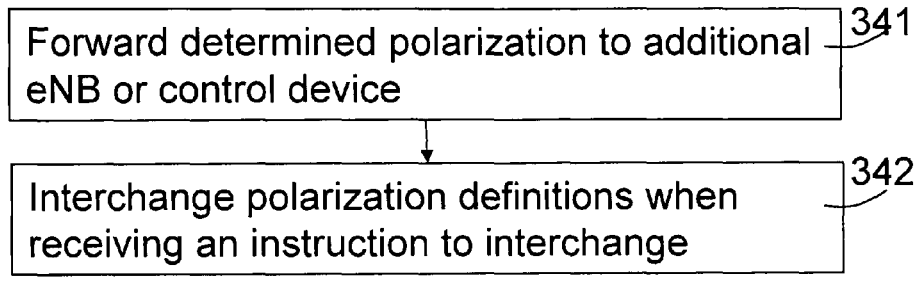
Figure 3C:
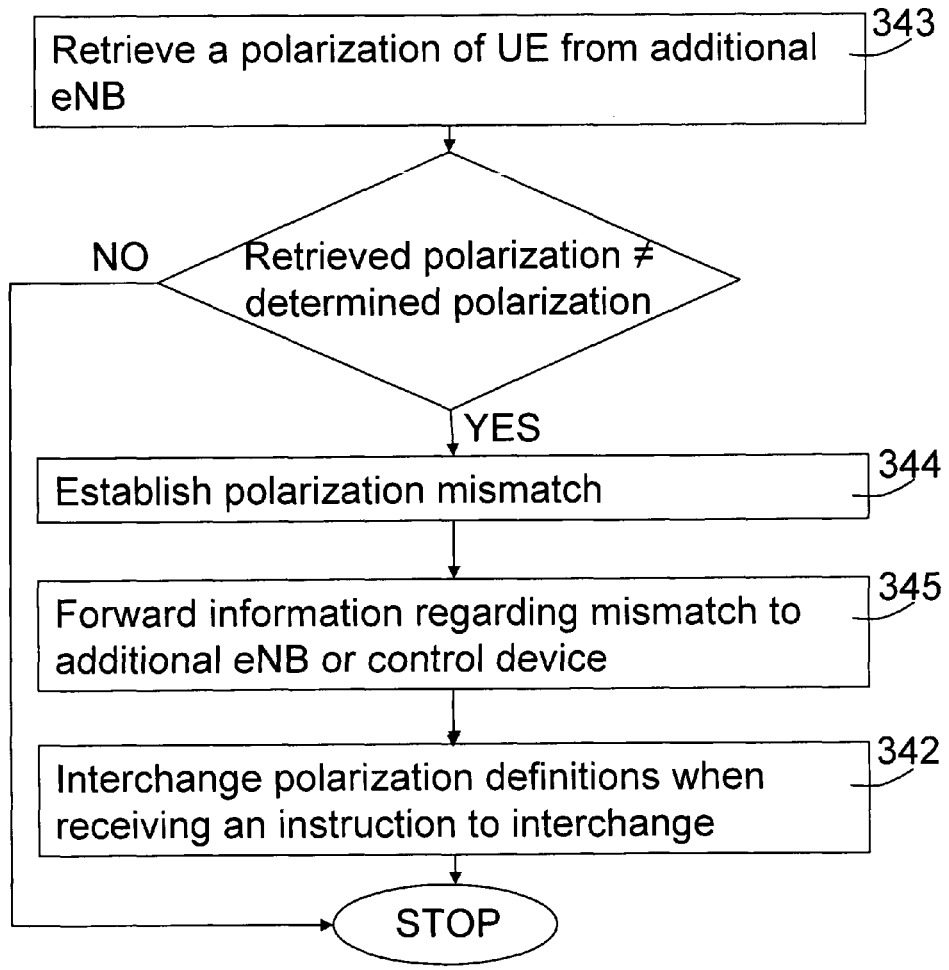
Figure 3D:
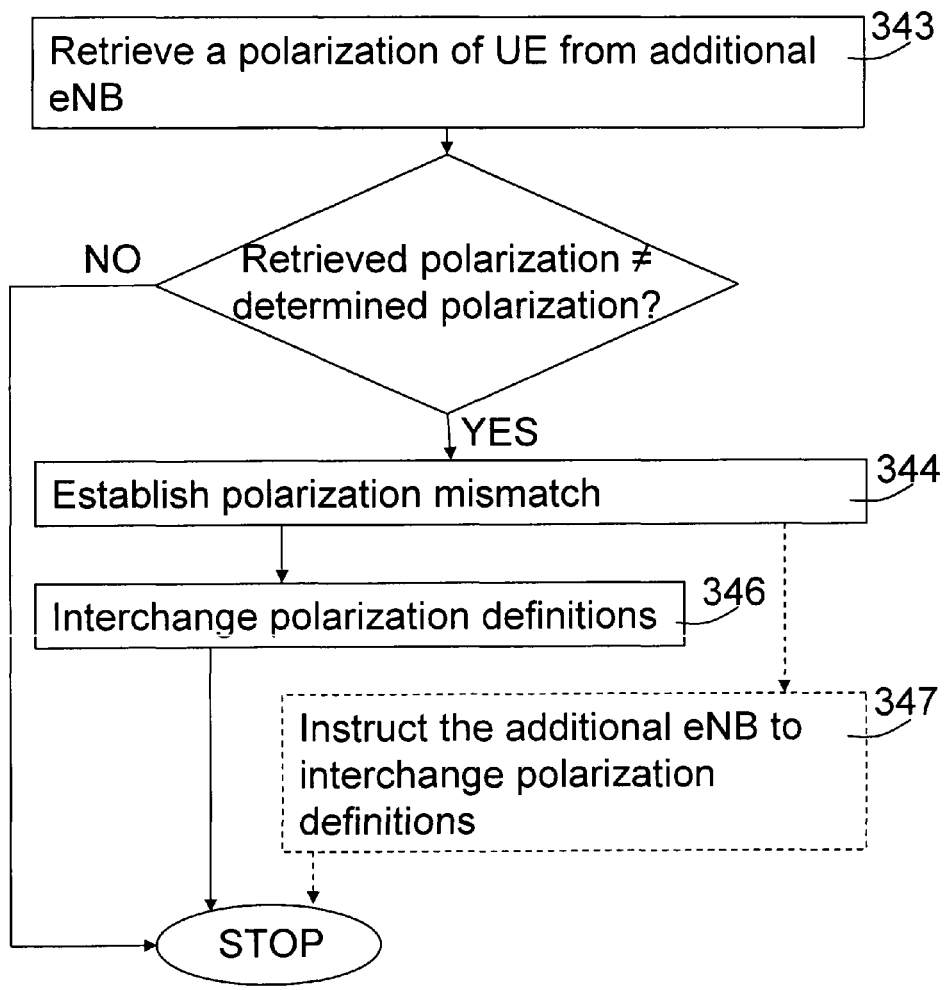

FIGS. 3*b*-3*d* illustrate schematically different embodiments of the present invention related to the step 340 of coordinating the defined polarizations with the polarizations of the additional eNB. In FIG. 3*b*, the step 340 of coordinating comprises the step 341 of forwarding the determined polarization to a control device, and the step 342 of interchanging the definition of the polarization generated by the first phase offset and the definition of the polarization generated by the second phase offset, if receiving an instruction to interchange from the control device. Such an instruction will of course only be received if there is a polarization mismatch. If there is a mismatch, and as the polarization generated by the first phase offset was defined to be vertical before the interchange, it will thus be defined to be horizontal after the interchange, and the opposite is true for the polarization generated by the second phase offset. In an alternative embodiment the determined polarization could be forwarded to the additional eNB instead of the control device, and the instruction to interchange will then be received from the additional eNB if there is a polarization mismatch and if the additional eNB decides not to interchange itself.

In FIGS. 3c and 3d illustrating alternative embodiments, the step 340 of coordinating comprises the step 343 of retrieving a UE polarization from the additional eNB. If the retrieved UE polarization and the own determined UE polarization differs, the eNB will establish a polarization mismatch in step 344. When a polarization mismatch has been established, FIG. 3c illustrates one embodiment, where the eNB in step 345 forwards information regarding the mismatch to a control device. The control device may then decide which one of the two eNBs that should interchange their definitions, and in step 342 the eNB may thus interchange definitions if it receives an instruction to do so. Alternatively, the information regarding the mismatch is forwarded to the additional eNB instead, and that additional eNB will decide if it should interchange its definitions or if it should instruct the first eNB to interchange.

In an alternative embodiment illustrated in FIG. 3d, the first eNB may, after the steps 343 and 344 described above, in step 346 interchange its polarization definitions when it has established a polarization mismatch in step 344, or it may in step 347 instruct the additional eNB to interchange its polarization definitions. In this embodiment it is the first eNB that decides about the interchange.

Summarizing, the step of coordinating 340 comprises a comparison, a decision regarding the interchange, and an interchange. In the alternative embodiments of the step of controlling 340 described above, the comparison and the decision may be performed by either of the two eNBs or by a control device, and the interchange may be done in at least one of the eNBs. Depending on the embodiment, it is either a UE polarization that is communicated, or the information that there exists a polarization mismatch. An instruction to interchange may also be communicated between the eNBs or between control device and eNBs. As already stated above, it may also be a UE that coordinates its polarizations with additional UEs, and the UEs are then comparing a measured polarization of an eNB, or another UE, in order to decide if an interchange is needed. In another alternative embodiment, it may also be a eNB that coordinates its polarizations with a relay, based on a measured UE polarization. Alternatively, it may also be the receiver radio chain of the eNB that coordinates with the transmitter radio chain of the eNB, or two transmitter radio chains of different frequencies that coordinate with each other.

Figure 3E:
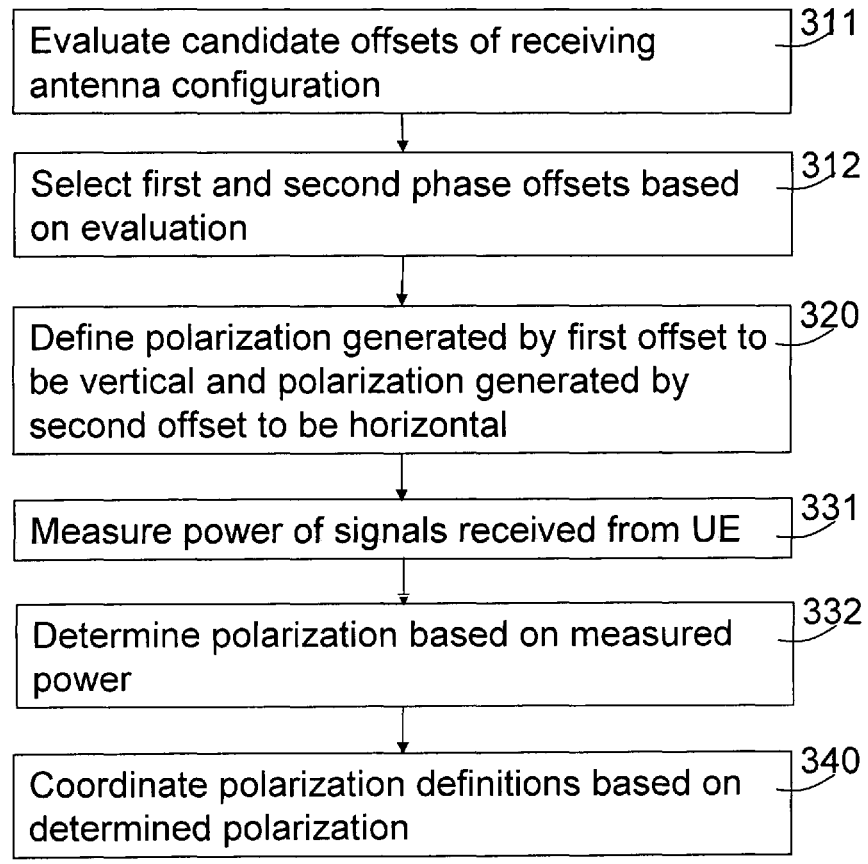
Figure 3F:
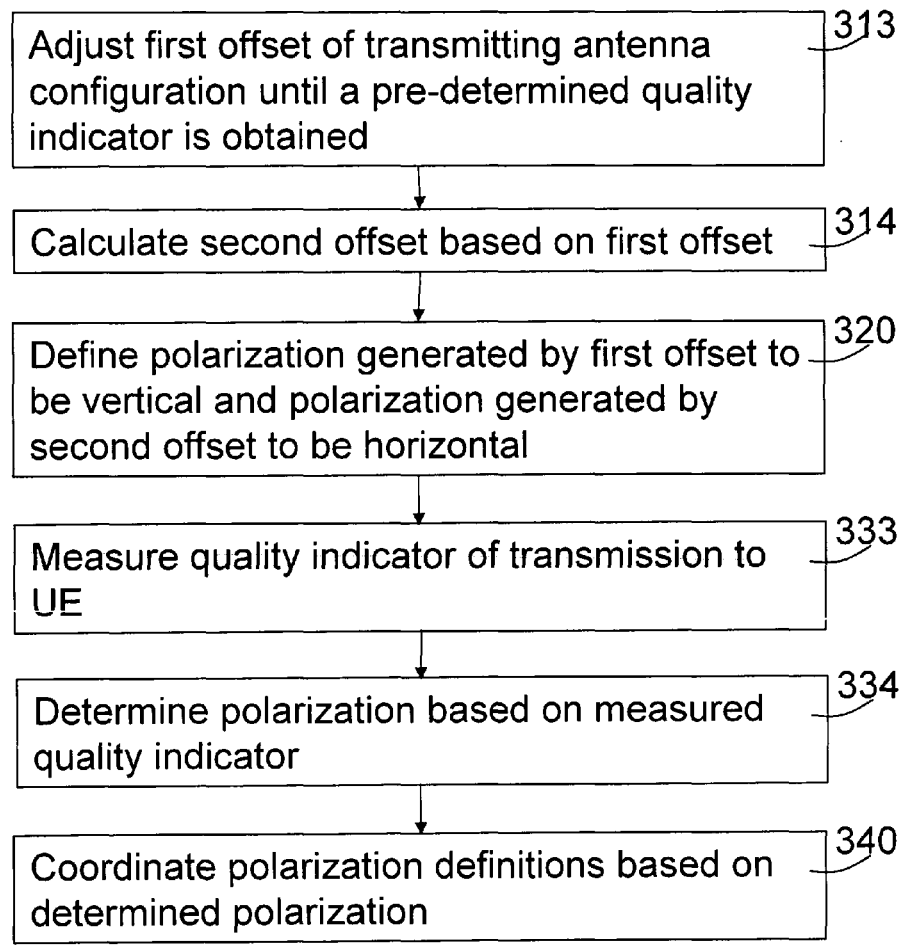

FIGS. 3e-3f illustrate schematically different embodiments of the present invention related to the step 310 of establishing the first and second phase offsets of the eNB antenna configuration generating an effective vertical and horizontal polarization. As the antenna configuration of the eNB comprises both a receiving and a transmitting antenna configuration, the offsets may be established for the receiving antenna configuration, as in FIG. 3e, and for the transmitting antenna configuration as in FIG. 3f. In FIG. 3e, the step 310 of establishing the phase offset of the receiving antenna configuration comprises:

311: Evaluate a number of candidate first and second phase offsets of the receiving antenna configuration.
312: Select a first and a second offset based on the evaluation. The candidate offsets that show a characteristic particular to VP or HP are selected.

The polarizations generated by the selected first and second offsets are then in step 320 defined to be vertical and horizontal respectively. As it is the offsets of the receiving antenna polarization that has been established, the determination of the UE polarization may thus be done for the UE transmitting antenna configuration based on uplink measurements. The step 330 of determining the UE polarization thus comprises:

331: Measure the power of signals received from the UE using both the first and the second offset.
332: Determine the UE polarization based on the power measurement. If it is the offset that generates a polarization defined as vertical that provides the highest received signal strength, the eNB can determine the UE antenna polarization to be vertical.

In FIG. 3f, the step 310 of establishing the phase offset of the transmitting antenna configuration comprises:

313: Adjust the first offset of the transmitting antenna configuration until a pre-determined quality indicator of the communication with the UE is obtained. Such a quality indicator may be the throughput or the rank indicator e.g. An offset giving the highest throughput will most probably correspond to the VP or the HP polarization.
314: The second offset $\beta$ is then calculated based on the first offset $\alpha$, by adding 180° to the first offset ($\beta=\alpha+180°$).

The polarizations generated by the established first and second offsets are then in step 320 defined to be vertical and horizontal respectively. As it is the offsets of the transmitting antenna polarization that has been established, the determination of the UE polarization may thus be done for the UE receiving antenna configuration based on downlink measurements. The step 330 of determining the UE polarization thus comprises:

333: Measure a quality indicator of the transmission to the UE for both offsets.
334: Determine the UE polarization based on the quality indicator measurement. If it is the offset that is defined as generating a horizontal polarization that provides the best quality indicator, then the UE antenna polarization is determined to be horizontal.

Figure 3G:
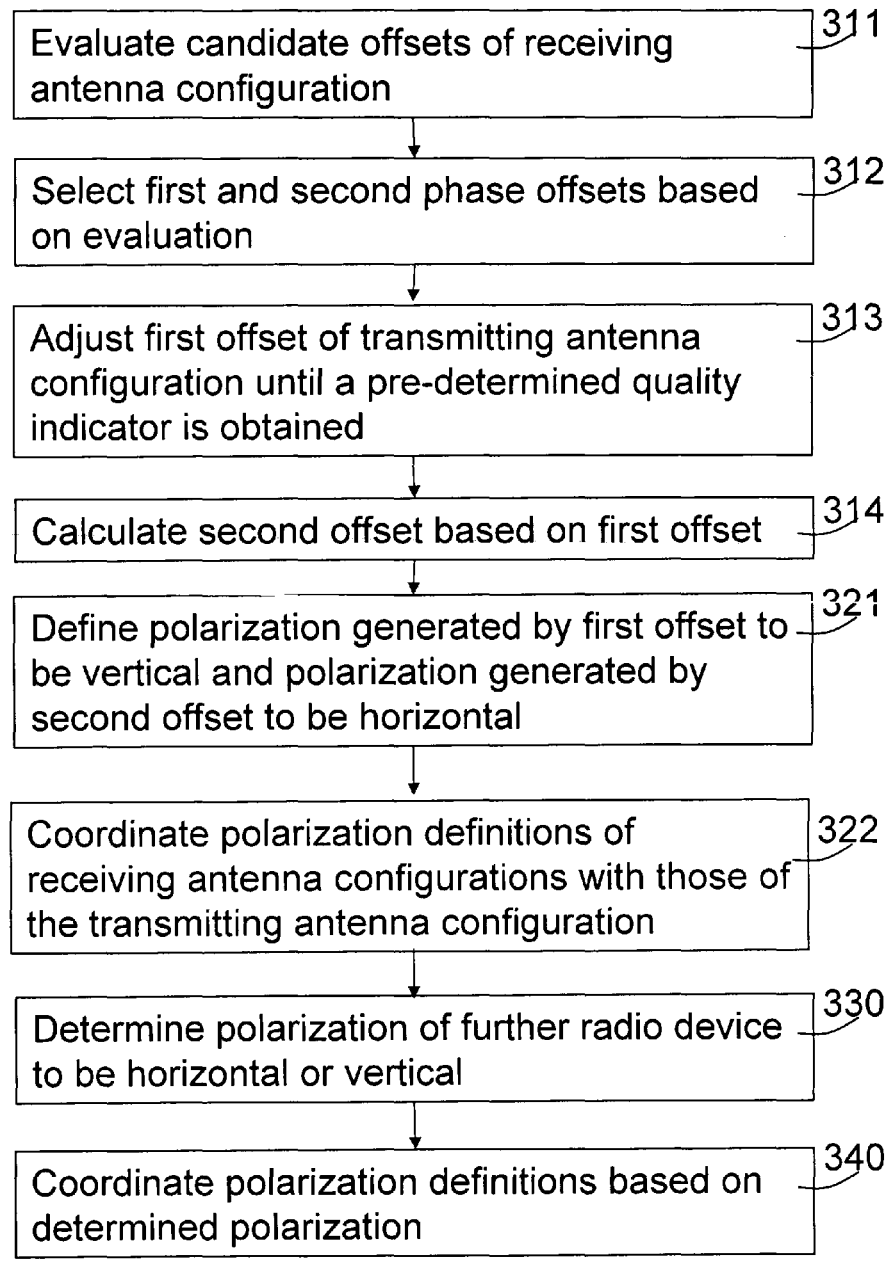

FIG. 3g illustrates schematically an embodiment of the present invention, where the step 330 of both the embodiments of FIGS. 3e and 3f are combined. The offsets of both the receiving and the transmitting antenna configurations of the eNB are thus established in steps 311 to 314. In this case the next step 320 of defining what polarization that the first and second offsets generates, comprises step 321 where this definition is done for both the receiving and the transmitting antenna configuration, and step 322, where the definitions of the receiving antenna configuration are coordinated with the definitions of the transmitting antenna configuration. This embodiment is applicable for the case of a coordination between eNBs and is thus using the coordination of polarizations within the eNB in step 322. After step 322, the eNB may determine a UE polarization (in step 330) based either on uplink or downlink measurements or both. Both uplink and downlink measurements may be used in order to determine the UE polarization in a more reliable way.

Figure 4:
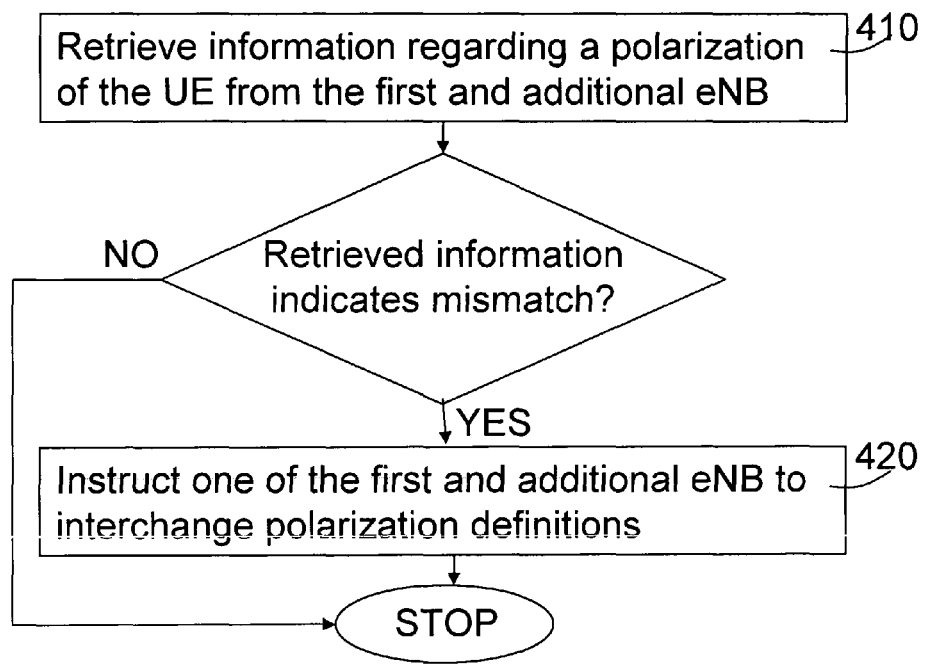
FIG. 4 is a flowchart of the method performed by the control device according to embodiments of the present invention.

FIG. 4 is a flowchart of the method, performed by the control device, of coordinating polarizations of a first eNB with polarizations of an additional eNB. The control device is connected to the first and the additional eNB, and the polarizations are generated by an antenna configuration comprising two orthogonally polarized antennas. The first and additional eNBs communicate wirelessly with a UE. The method comprises the following steps:

410: Retrieving information regarding a polarization of the UE from at least one of the first and additional eNBs. In one embodiment, the UE polarization is retrieved from both eNBs and the control device thus makes the comparison and establishes if there is a polarization mismatch or not. In another embodiment, the comparison has already been done by one of the eNBs, so the control device retrieves information about the establishes mismatch from one of the eNBs instead.

420: Instruct one of the first and additional radio devices to interchange when the retrieved information indicates a polarization mismatch. The control device thus decide about which one of the eNBs that should interchange and send an instruction to the relevant eNB either based on the comparison result of the retrieved information or based on that it has retrieved information from an eNB that there is a mismatch.

Figure 5A:
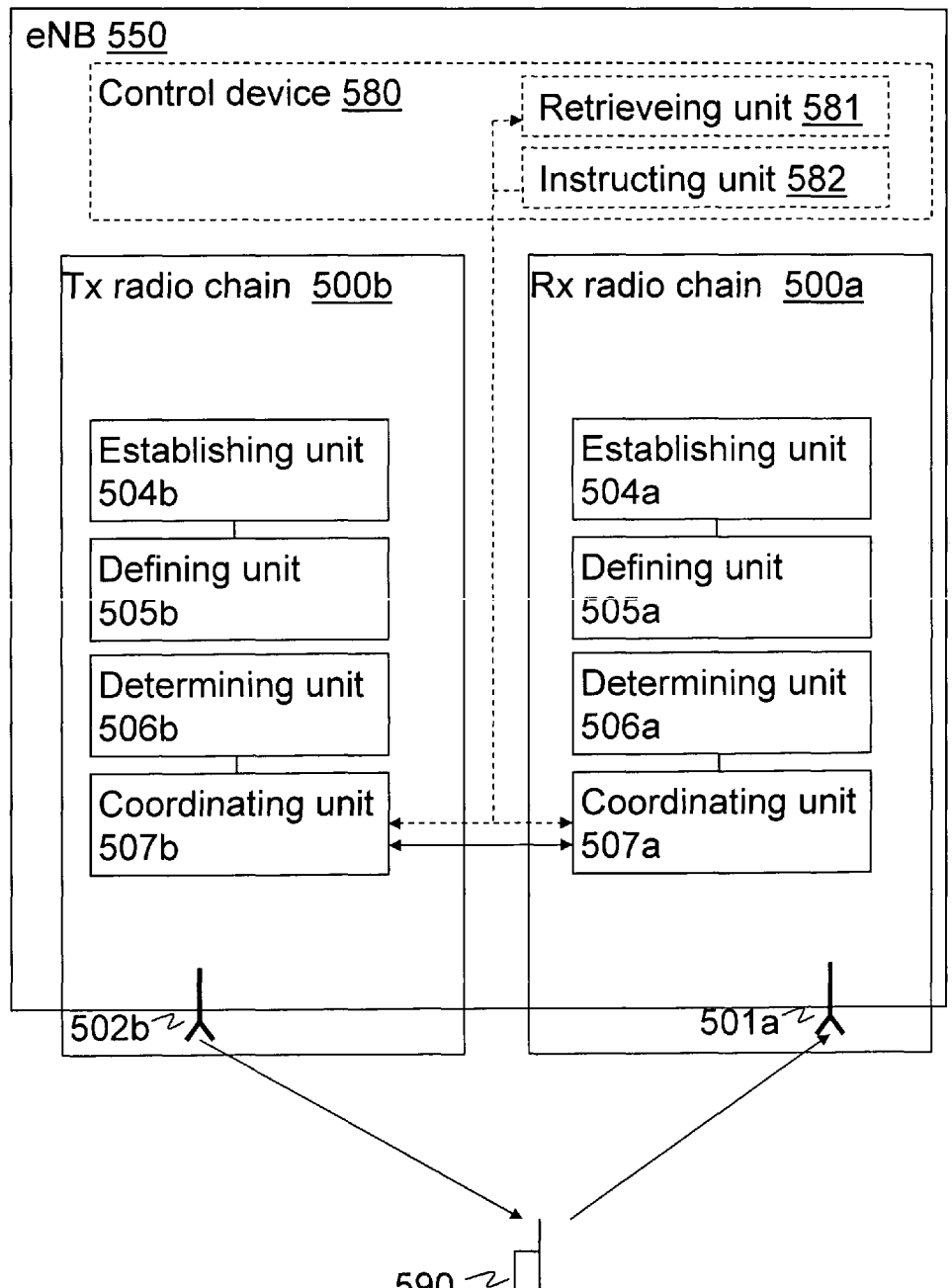
FIG. 5a illustrates schematically a transmitting and a receiving radio chain in an eNB and a control device according to embodiments of the present invention.

Schematically illustrated in FIG. 5a and according to embodiments of the present invention, is an eNB 550 with a first radio device, i.e. the receiving radio chain 500a, and an additional radio device, i.e. the transmitting radio chain 500b. The first and additional radio devices are of a same type in this case, as they are both radio chains in an eNB. However, as stated above, the first and additional radio devices 500a, 500b may in another embodiment also be two transmitting radio chains, or two radio chains in a UE e.g. The receiving radio chain 500a is configured to coordinate polarizations generated by its antenna configuration 501a, with polarizations generated by the antenna configuration 502b of the transmitting radio chain 500b. The receiving and transmitting radio chains are configured to communicate wirelessly with at least one further radio device which may be e.g. a UE or an eNB. In this embodiment the radio chains both communicate with a UE 590. The receiving radio chain 500a comprises an establishing unit 504a arranged to establish a first amplitude and/or phase offset of the antenna configuration 501a, generating a vertical or horizontal polarization. An amplitude offset is e.g. established in the case of a VP/HP antenna configuration, and a phase offset in the case of a slant +45/−45 antenna configuration. The establishing unit 504a is also arranged to establish a second amplitude and/or phase offset of the antenna configuration 501a generating a polarization orthogonal to the polarization generated by the first amplitude and/or phase offset. The receiving radio chain 500a further comprises a defining unit 505a arranged to define the polarization generated by the first offset to be vertical and the polarization generated by the second offset to be horizontal, a determining unit 506a arranged to determine the polarization of the UE 590, and a coordinating unit 507a arranged to coordinate the defined polarizations with the polarizations of the transmitting radio chain based on the determined polarization of the UE. The transmitting radio chain will correspondingly also comprise an establishing unit 504b, a defining unit 505b, a determining unit 506b and a coordinating unit 507b.

Also illustrated in FIG. 5a and according to embodiments of the present invention, is the control device 580 connectable to the receiving and transmitting radio chain 500a, 500b. In this embodiment, the control device is comprised in the eNB. However, the preferred location for such a control device may be some central node in the core network, and the connection to the control device may then be wireless, since radio base stations often are connected over wireless backhaul links to the core network. The control device comprises a retrieving unit 581 arranged to retrieve information regarding the UE polarization from at least the receiving radio chain 500a, and an instructing unit 582 arranged to instruct at least one of the radio chains to interchange polarization definitions when the retrieved information indicates a polarization mismatch.

In one embodiment, the coordinating units 507a, 507b of the two radio chains may be further arranged to forward the determined UE polarization to the control device 580. The retrieving unit 581 of the control device is further arranged to compare the retrieved UE polarizations and establish a polarization mismatch when they differ from each other. In case of an established polarization mismatch, the instructing unit 582 is arranged to instruct one of the radio chains to interchange polarization definitions. The coordinating units 507a, 507b of the two radio chains may thus be further arranged to interchange their polarization definitions when they are instructed to do so by the control device 580.

In an alternative embodiment, the coordinating unit 507a of the receiving radio chain 500a is arranged to forward the determined UE polarization to the transmitting radio chain 500b. The coordinating unit 507a is then also configured to interchange its polarization definitions if it is instructed to do so by the transmitting radio chain 500b.

In still another embodiment, the coordinating unit 507a of the receiving radio chain 500a is arranged to retrieve the UE polarization from the transmitting radio chain 500b, to establish a polarization mismatch when the retrieved UE polarization differs from the determined UE polarization, and to forward information about the polarization mismatch to the control device 580 in a first embodiment or to the transmitting radio chain 500b in a second embodiment. The control device 580 in the first embodiment or the transmitting radio chain 500b in the second embodiment, will then decide if the interchange should be done in the receiving or in the transmitting radio chain. The control device will in the first embodiment instruct one of the radio chains to interchange. In the second embodiment the transmitting radio chain will either interchange its own definitions or instruct the receiving radio chain to interchange. In a further alternative embodiment the coordinating unit 507a of the receiving radio chain 500a interchanges its definitions or instructs the transmitting radio chain 500b to interchange when it has established a polarization mismatch. In this embodiment it is thus the receiving radio chain that decides where the interchange should be done.

The establishing unit 504a of the receiving radio chain 500a may in one embodiment be further arranged to evaluate a number of candidate first and second offsets of the receiving antenna configuration 501a, and to select the first and second offsets of the receiving antenna configuration among the candidate offsets based on the evaluation. The determining unit 506a of the receiving radio chain 500a may then be further arranged to measure a power of signals received from the UE 590 when applying the established first and second offsets of the receiving antenna configuration 501a, and to determine the polarization of the UE based on the measured power.

Correspondingly, the establishing unit 504b of the transmitting radio chain 500b may also be arranged to adjust a first offset of a transmitting antenna configuration until a predetermined quality indicator of the communication with the UE 590 is obtained, and to calculate a second offset of the transmitting antenna configuration based on the first offset. The determining unit 506b of the transmitting radio chain 500b may then be arranged to measure a quality indicator of a transmission to the UE when applying the established first and second offset of the transmitting antenna configuration, and to determine the polarization of the UE based on the measured quality indicator.

Figure 5B:
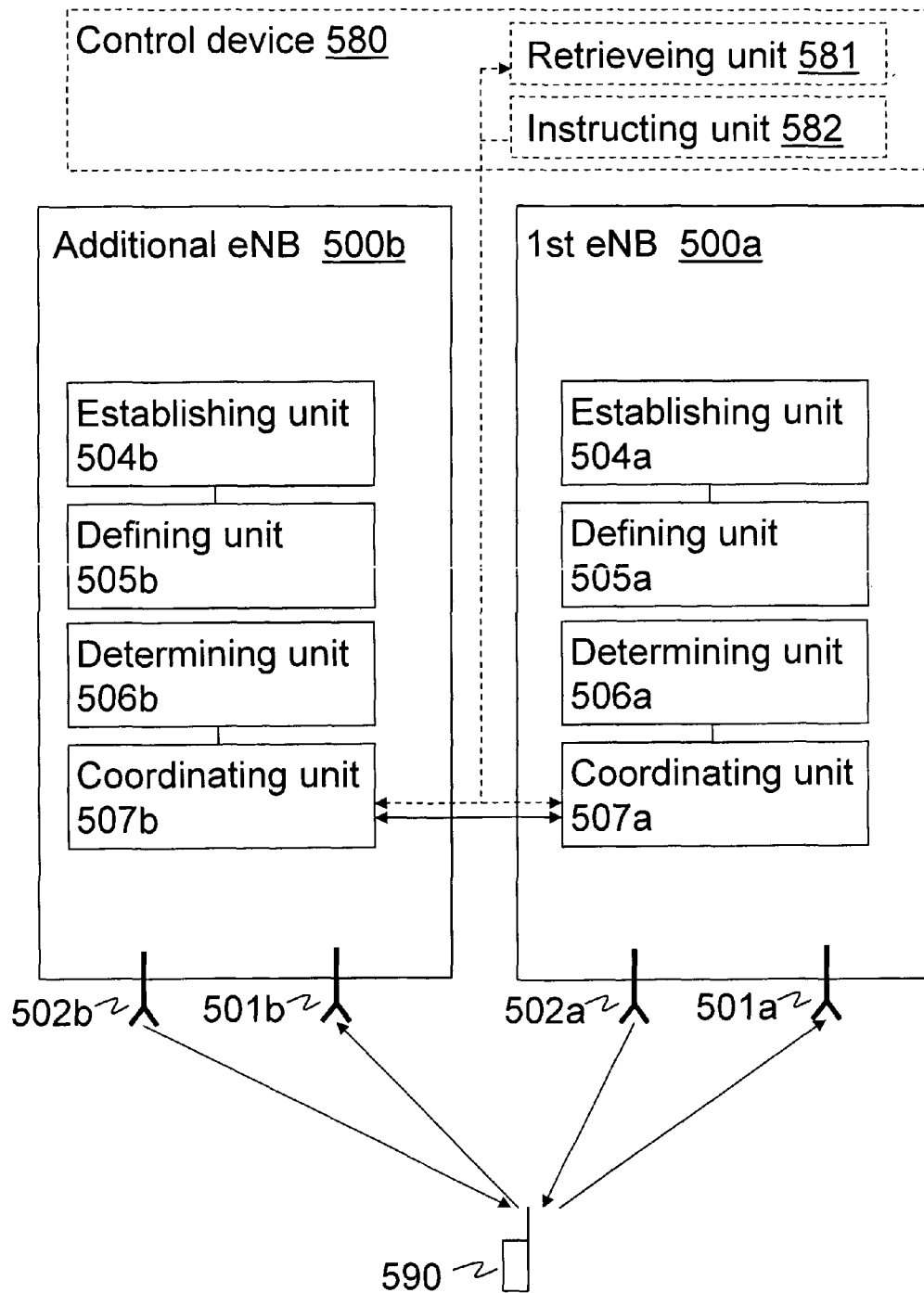
FIG. 5b illustrates schematically two eNBs and a control device according to embodiments of the present invention.

Schematically illustrated in FIG. 5b and according to embodiments of the present invention is a first eNB 500a and an additional eNB 500b. Also a control device 580 is illustrated in this figure, which may be a separate dedicated node or may be comprised in for example a core network node as described above, or a radio network node. The first eNB 500a is configured to coordinate polarizations generated by its receiving and transmitting antenna configuration 501a, 502a, with polarizations generated by the receiving and transmitting antenna configuration 501b, 502b of the additional eNB 500b. The eNBs 500a, 500b are configured to communicate wirelessly with a further radio device. In this embodiment the eNBs both communicate with a UE 590. As stated above, it may also be two UEs coordinating polarizations with each other and communicating wirelessly with an eNB or another UE. The first eNB 500a comprises an establishing unit 504a arranged to establish a first amplitude and/or phase offset of the antenna configurations 501a, 502a generating a vertical or horizontal polarization. An amplitude offset is established in the case of a VP/HP antenna configuration, and a phase offset in the case of a slant +45/−45 antenna configuration. The establishing unit 504a is also arranged to establish a second amplitude and/or phase offset of the antenna configurations 501a, 502a generating a polarization orthogonal to the polarization generated by the first amplitude and/or phase offset. The first eNB 500a further comprises a defining unit 505a arranged to define the polarization generated by the first offset to be vertical and the polarization generated by the second offset to be horizontal, a determining unit 506a arranged to determine the polarization of the UE 590, and a coordinating unit 507a arranged to coordinate the defined polarizations with the polarizations of the additional eNB 500b based on the determined polarization of the UE. The additional eNB 500b will correspondingly also comprise an establishing unit 504b, a defining unit 505b, a determining unit 506b and a coordinating unit 507b.

The establishing unit 504a of the first eNB 500a may in this embodiment be further arranged to evaluate a number of candidate first and second offsets of the receiving antenna configuration 501a, and to select the first and second offsets of the receiving antenna configuration among the candidate offsets based on the evaluation. The establishing unit 504a may also be arranged to adjust a first offset of the transmitting antenna configuration 502a until a pre-determined quality indicator of the communication with the UE 590 is obtained, and to calculate a second offset of the transmitting antenna configuration 502a based on the first offset. As the offsets of the receiving and the transmitting antenna configurations 501a, 502b of the first eNB are established, the defining unit 505a may be further arranged to define polarizations generated by the first offsets to be vertical, and the polarizations generated by the second offsets to be horizontal, and to coordinate the definitions of the polarizations generated by the offsets of the receiving antenna configurations 501a with the offsets of the transmitting antenna configuration 502a of the first eNB, as described above with reference to FIG. 5a. This is done in order to assure that the polarizations are coordinated within the first eNB 500a, before they are coordinated also with the polarizations of an additional eNB 500b. The determining unit 506a of the first eNB 500a may then be further arranged to measure a power of signals received from the UE 590 when applying the established first and second offsets of the receiving antenna configuration 501a, and to determine the polarization of the UE based on the measured power. It may also be arranged to measure a quality indicator of a transmission to the UE when applying the established first and second offset of the transmitting antenna configuration, and to determine the polarization of the UE based on the measured quality indicator.

The above mentioned and described embodiments are only given as examples and should not be limiting to the present invention. Other solutions, uses, objectives, and functions within the scope of the invention as claimed in the accompanying patent claims should be apparent for the person skilled in the art.

The invention claimed is:

1. A method of coordinating polarizations of a first radio device with polarizations of an additional radio device, wherein the polarizations are generated by an antenna configuration comprising at least two orthogonally polarized antennas, and wherein the first and additional radio devices communicate wirelessly with at least one further radio device, the method being performed by the first radio device and comprising:
   establishing a first amplitude and/or phase offset of the antenna configuration generating a vertical or horizontal polarization, and a second amplitude and/or phase offset of the antenna configuration generating a polarization orthogonal to said polarization generated by the first amplitude and/or phase offset;
   defining the polarization generated by the first amplitude and/or phase offset to be vertical and the polarization generated by the second amplitude and/or phase offset to be horizontal;
   determining a polarization of at least one of said further radio devices; and
   coordinating the defined polarizations with polarizations of the additional radio device based on the determined polarization and interchanging the defined polarizations when there is an indication of a polarization mismatch.

2. The method according to claim 1, wherein the step of coordinating the defined polarizations comprises:
   forwarding the determined polarization to a control device connected to the first and additional radio device or to the additional radio device; and
   interchanging the definition of the polarization generated by the first amplitude and/or phase offset and the definition of the polarization generated by the second amplitude and/or phase offset, when receiving an instruction to interchange from the control device or from the additional radio device.

3. The method according to claim 1, wherein the step of coordinating the defined polarizations comprises,
   retrieving a polarization of at least one of said further radio devices from the additional radio device, and
   establishing a polarization mismatch, when the retrieved polarization is different from the determined polarization.

4. The method according to claim 3, wherein the step of coordinating further comprises forwarding information regarding the polarization mismatch to a control device connected to the first and additional radio device or to the additional radio device, and interchanging the definition of the polarization generated by the first amplitude and/or phase offset and the definition of the polarization generated by the second amplitude and/or phase offset, when receiving an instruction to interchange from the control device or from the additional radio device.

5. The method according to claim 3, wherein the step of coordinating further comprises interchanging the definition of the polarization generated by the first amplitude and/or phase offset and the definition of the polarization generated by the second amplitude and/or phase offset, when a polarization mismatch is established.

6. The method according to claim 3, wherein the step of coordinating further comprises instructing the additional radio device to interchange the definition of the polarization, when a polarization mismatch is established.

7. The method according to claim 1, wherein the step of determining comprises:
   measuring a power of signals received from the at least one of said further radio devices when applying the established first and second amplitude and/or phase offsets of a receiving antenna configuration, and
   determining the polarization of the at least one of said further radio devices based on the measured power.

8. The method according to claim 1, wherein the step of determining comprises:
   measuring a quality indicator of a transmission to the at least one of said further radio devices when applying the established first and second amplitude and/or phase offset of a transmitting antenna configuration, and
   determining the polarization of the at least one of said further radio devices based on the measured quality indicator.

9. The method according to claim 1, wherein the step of establishing comprises
   evaluating a number of candidate first and second amplitude and/or phase offsets of a receiving antenna configuration, and
   selecting a first and second amplitude and/or phase offsets of the receiving antenna configuration among the number of candidate first and second amplitude and/or phase offsets based on the evaluation.

10. The method according to claim 1, wherein the step of establishing comprises
    adjusting a first amplitude and/or phase offset of a transmitting antenna configuration until a pre-determined quality indicator of the communication with the at least one of said further radio devices is obtained, and
    calculating a second amplitude and/or phase offset of the transmitting antenna configuration based on the first amplitude and/or phase offset of the transmitting antenna configuration.

11. The method according to claim 9, wherein the step of defining comprises:
    defining the polarizations generated by the first amplitude and/or phase offset of the receiving and transmitting antenna configurations to be vertical and the polarizations generated by the second amplitude and/or phase offset of the receiving and transmitting antenna configurations to be horizontal, and
    coordinating the defined polarizations generated by the first and second amplitude and/or phase offsets of the receiving antenna configuration with the defined polarizations generated by the first and second amplitude and/or phase offset of the transmitting antenna configuration.

12. The method according to claim 1, wherein the first and additional radio devices are radio chains in a radio base station or radio chains in a user equipment, and wherein the further radio device is a radio base station or a user equipment.

13. The method according to claim 1, wherein the radio devices are radio base stations or user equipments.

14. A method for a control device of coordinating polarizations of a first radio device with polarizations of an additional radio device, wherein the control device is connected to the first and additional radio device, wherein the polarizations are generated by an antenna configuration comprising at least two orthogonally polarized antennas, and wherein the first and additional radio devices communicate wirelessly with at least one further radio device, the method comprising:
    retrieving information regarding a polarization of the at least one further radio device from at least one of the first and additional radio devices; and
    instructing at least one of the first and additional radio devices to interchange a definition of the generated polarization when the retrieved information indicates a polarization mismatch.

15. The method according to claim 14, wherein the step of retrieving comprises
    retrieving the polarization of the at least one further radio device from the first and additional radio devices, and
    establishing the polarization mismatch when the retrieved polarizations are different.

16. The method according to claim 14, wherein the step of retrieving comprises retrieving information regarding the polarization mismatch from at least one of the first and additional radio devices.

17. A first radio device comprising an antenna configuration with at least two orthogonally polarized antennas, the first radio device being configured to coordinate polarizations generated by the antenna configuration with polarizations generated by an antenna configuration of an additional radio device, wherein the first and additional radio devices are configured to communicate wirelessly with at least one further radio device, the first radio device comprising:
    an establishing unit arranged to establish a first amplitude and/or phase offset of the antenna configuration generating a vertical or horizontal polarization, and a second amplitude and/or phase offset of the antenna configuration generating a polarization orthogonal to said polarization generated by the first amplitude and/or phase offset,
    a defining unit arranged to define the polarization generated by the first amplitude and/or phase offset to be vertical and the polarization generated by the second amplitude and/or phase offset to be horizontal,
    a determining unit arranged to determine a polarization of at least one of said further radio devices, and
    a coordinating unit arranged to coordinate the defined polarizations with the polarizations of the additional radio device based on the determined polarization and to interchange the defined polarizations when there is an indication of a polarization mismatch.

18. The first radio device according to claim 17, wherein the coordinating unit is further arranged to
    forward the determined polarization to a control device connected to the first and additional radio devices, or to the additional radio device, and
    interchange the definition of the polarization generated by the first amplitude and/or phase offset and the definition of the polarization generated by the second amplitude and/or phase offset, when receiving an instruction to interchange from the control device or from the additional radio device.

19. The first radio device according to claim 17, wherein the coordinating unit is further arranged to
    retrieve a polarization of at least one of said further radio devices from the additional radio device, and
    establish a polarization mismatch, when the retrieved polarization is different from the determined polarization.

20. The first radio device according to claim 19, wherein the coordinating unit is further arranged to
    forward information regarding the polarization mismatch to a control device or the additional radio device, and
    interchange the definition of the polarization generated by the first amplitude and/or phase offset and the definition of the polarization generated by the second amplitude and/or phase offset, when receiving an instruction to interchange from the control device or the additional radio device.

21. The first radio device according to claim 19, wherein the coordinating unit is further arranged to interchange the definition of the polarization generated by the first amplitude and/or phase offset and the definition of the polarization generated by the second amplitude and/or phase offset, when a polarization mismatch is established.

22. The first radio device according to claim 19, wherein the coordinating unit is further arranged to instruct the additional radio device to interchange the definition of the polarization, when a polarization mismatch is established.

23. The first radio device according to claim 17, wherein the determining unit is further arranged
to measure a power of signals received from the at least one of said further radio devices when applying the established first and second amplitude and/or phase offsets of a receiving antenna configuration, and
to determine the polarization of the at least one of said further radio devices based on the measured power.

24. The first radio device according to claim 17, wherein the determining unit is further arranged
to measure a quality indicator of a transmission to the at least one of said further radio devices when applying the established first and second amplitude and/or phase offset of a transmitting antenna configuration, and
to determine the polarization of the at least one of said further radio devices based on the measured quality indicator.

25. The first radio device according to claim 17, wherein the establishing unit is further arranged
to evaluate a number of candidate first and second amplitude and/or phase offsets of a receiving antenna configuration, and
to select a first and second amplitude and/or phase offsets of the receiving antenna configuration among the number of candidate first and second amplitude and/or phase offsets based on the evaluation.

26. The first radio device according to claim 17, wherein the establishing unit is further arranged
to adjust a first amplitude and/or phase offset of a transmitting antenna configuration until a pre-determined quality indicator of the communication with the at least one of said further radio devices is obtained, and
to calculate a second amplitude and/or phase offset of the transmitting antenna configuration based on the first amplitude and/or phase offset of the transmitting antenna configuration.

27. The first radio device according to claim 25, wherein the defining unit is further arranged
to define the polarizations generated by the first amplitude and/or phase offset of the receiving and transmitting antenna configurations to be vertical and the polarizations generated by the second amplitude and/or phase offset of the receiving and transmitting antenna configurations to be horizontal, and
coordinate the definitions of the polarizations generated by the first and second amplitude and/or phase offsets of the receiving antenna configuration with the definitions of the polarizations generated by the first and second amplitude and/or phase offset of the transmitting antenna configuration.

28. The first radio device according to claim 17, wherein the first and additional radio devices are radio chains in a radio base station or radio chains in a user equipment, and wherein the further radio device is a radio base station or a user equipment.

29. The first radio device according to claim 17, wherein the radio devices are radio base stations or user equipments.

30. A control device connectable to a first and an additional radio device and configured to coordinate polarizations of the first radio device with polarizations of the additional radio device, wherein the polarizations are generated by an antenna configuration comprising at least two orthogonally polarized antennas, and wherein the first and additional radio devices communicate wirelessly with at least one further radio device, the control device comprising:
a retrieving unit arranged to retrieve information regarding a polarization of the at least one further radio device from at least one of the first and additional radio devices, and
an instructing unit arranged to instruct at least one of the first and additional radio devices to interchange a definition of the generated polarization when the retrieved information indicates a polarization mismatch.

31. The control device according to claim 30, wherein the retrieving unit is further arranged to retrieve the polarization of the at least one further radio device from the first and additional radio devices, and establish the polarization mismatch when the retrieved polarizations are different.

32. The control device according to claim 30, wherein the retrieving unit is further arranged to retrieve information regarding the polarization mismatch from at least one of the first and additional radio devices.

* * * * *

UNITED STATES PATENT AND TRADEMARK OFFICE
CERTIFICATE OF CORRECTION

PATENT NO. : 8,929,953 B2  
APPLICATION NO. : 13/515862  
DATED : January 6, 2015  
INVENTOR(S) : Asplund et al.

Page 1 of 1

It is certified that error appears in the above-identified patent and that said Letters Patent is hereby corrected as shown below:

In the Specification

In Column 3, Line 57, delete "150a 150b." and insert -- 150a, 150b. --, therefor.

In Column 5, Line 1, delete "antennas" and insert -- antennas. --, therefor.

In Column 9, Line 9, delete "a that" and insert -- $\alpha$ that --, therefor.

Signed and Sealed this  
Thirtieth Day of June, 2015

Michelle K. Lee  
*Director of the United States Patent and Trademark Office*